United States Patent
Bendickson et al.

(10) Patent No.: US 8,786,546 B1
(45) Date of Patent: Jul. 22, 2014

(54) HANDS-FREE ELECTROENCEPHALOGRAPHY DISPLAY ENABLEMENT AND UNLOCK METHOD AND APPARATUS

(75) Inventors: John Bendickson, Vinton, IA (US); Maury Anderson, Cedar Rapids, IA (US)

(73) Assignee: Rockwell Collins, Inc, Cedar Rapids, IA (US)

( * ) Notice: Subject to any disclaimer, the term of this patent is extended or adjusted under 35 U.S.C. 154(b) by 195 days.

(21) Appl. No.: 13/571,615

(22) Filed: Aug. 10, 2012

(51) Int. Cl.
*G06F 3/033* (2013.01)

(52) U.S. Cl.
USPC .............. 345/157; 345/8; 345/158; 600/544; 600/545

(58) Field of Classification Search
CPC ................................ G06F 3/015; G06F 3/033
USPC .......... 345/156–158, 7–8; 600/544–545, 300, 600/372, 473
See application file for complete search history.

(56) References Cited

U.S. PATENT DOCUMENTS

| | | | |
|---|---|---|---|
| 4,709,702 A | 12/1987 | Sherwin | |
| 2009/0264787 A1* | 10/2009 | Lee et al. | 600/544 |
| 2010/0234752 A1* | 9/2010 | Sullivan et al. | 600/544 |

OTHER PUBLICATIONS

"Dialing with Your Thoughts", Technology Review published by MIT, printed from http://www.technologyreview.com/communications/37357/?nlid=4339&a=f, Jul. 7, 2011.

* cited by examiner

*Primary Examiner* — Lun-Yi Lao
*Assistant Examiner* — MD Saiful A Siddiqui
(74) *Attorney, Agent, or Firm* — Donna P. Suchy; Daniel M. Barbieri

(57) ABSTRACT

A method for activating an operational mode change of a device. The method includes flashing at least one indicator, wherein each of the at least one indicator flashes at a particular initial frequency. The method also includes receiving electroencephalograph (EEG) data from an EEG device of a user. The method further includes recognizing a portion of the received EEG data to substantially match activation EEG data, wherein the activation EEG data corresponds to predicted or recorded EEG data of the user in observance of one of the at least one indicator flashing at the particular initial frequency. The method additionally includes activating an operational mode change for providing power to a display upon recognizing the portion of the received EEG data to substantially match the activation EEG data.

18 Claims, 12 Drawing Sheets

HANDS-FREE ELECTROENCEPHALOGRAPHY DISPLAY ENABLEMENT AND UNLOCK METHOD AND APPARATUS

CROSS-REFERENCE TO RELATED APPLICATIONS

The present application incorporates herein by reference U.S. patent application Ser. No. 13/223,435, filed Sep. 1, 2011, entitled "MOUSE MOVEMENT METHOD", and U.S. patent application Ser. No. 13/240,396, filed Sep. 22, 2011, entitled "POSITIVE ACKNOWLEDGEMENT METHOD THAT INFORMATION IS RECEIVED".

FIELD OF THE INVENTION

The present invention is directed generally toward hands-free enablement and unlocking of user interfaces, and particularly toward enabling or unlocking user interfaces in conjunction with an electroencephalograph (EEG) device.

BACKGROUND OF THE INVENTION

The current method of enabling or unlocking displays, such as on smart phones or other devices, requires the touching of a button somewhere on the device to get the display to light up, then touching the device again to unlock the device, such as by swiping a slider button on that display. The current method of enabling and unlocking displays requires at least two very conscious and deliberate actions which require both of the user's hands unless the device is mounted.

Modern computing devices rely heavily on the ability of a user to enable and unlock a display, and typically modern computing devices require a user to use one or both hands to unable or unlock the display of the computing devices. Touch screens, keyboards, mice, trackpads and the like have become ubiquitous for enabling or unlocking displays or devices, but they require the use of the user's hands. Some users may lack the physical capacity to use a touch-screen or a pointing device, while other users may need to interact with a user interface at the same time as performing complex manual operations that require both hands. For example, soldiers using advanced combat equipment may have a computer display mounted to their helmets, but a soldier in combat cannot be expected to take one hand off his weapon to enable and/or unlock a computer display. In these situations, a user is not able to use his or her hands to interact with a user interface of a device.

Consequently, it would be advantageous if a method and apparatus existed which would be suitable for enabling, disabling, and/or unlocking a device or a display of a device without requiring the use of the user's hands.

SUMMARY OF THE INVENTION

Accordingly, the present disclosure is directed to a novel method and apparatus for hands-free activation of a power mode change, operational mode change, enablement, disablement, or unlocking of a display of a computing device with the use of electroencephalograph (EEG) device.

An embodiment includes a method and apparatus for activating an operational mode change of a device. The operational mode change may be or may include a power mode change, enablement of a display, disablement of the display, a change to the brightness of a display, or the like. The method includes flashing at least one indicator, wherein each of the at least one indicator flashes at a particular initial frequency. The method also includes receiving EEG data from an EEG device of a user. The EEG data may include brain signals, optic nerve signals, or brainwave patterns detected by an EEG device. The method further includes recognizing a portion of the received EEG data to substantially match activation EEG data. The activation EEG data may include predicted or recorded brain signals, optic nerve signals, brainwaves, or brainwave patterns. The activation EEG data corresponds to predicted or recorded EEG data of when the user is observing one of the at least one indicator flashing at the particular initial frequency. The method additionally includes activating the operational mode change for providing power to a display upon recognizing the portion of the received EEG data to substantially match the activation EEG data.

A second embodiment includes a method and apparatus for unlocking a device. The method includes displaying a plurality of flashing regions wherein each of the plurality of flashing regions flash at a different frequency. The method also includes receiving EEG data from an EEG device of a user. The received EEG data may include brain signals, optic nerve signals, brainwaves, or brainwave patterns detected by an EEG device. The method further includes recognizing at least two sequential portions of the received EEG data to substantially sequentially match at least two region EEG data sets. Each of the at least two region EEG data sets correspond to predicted or recorded EEG data of the user in observance of one of the plurality of flashing regions at a particular frequency. Additionally, the method includes unlocking the device if the at least two sequential portions of the received EEG data substantially sequentially match the at least two region EEG data sets.

A further embodiment includes a method and apparatus for unlocking a device. The method includes displaying a plurality of flashing regions. Each region of the plurality of flashing regions flashes at a different frequency. Each region of the plurality of flashing regions overlaps with at least another region of the plurality of flashing regions such that a particular location of a display is locatable based upon one or more relative flashing frequency strengths at the particular location on the display at a particular time. The method also includes receiving EEG data from an EEG device of a user. The method additionally includes recognizing at least two sequential portions of the received EEG data to substantially match at least two location EEG data sets. Each of the at least two location EEG data sets is associated with one particular location of at least two particular locations on the display at one time of at least two particular times. The method then includes determining a track of the user's point of focus as the user's point of focus moves across the display based upon recognizing the at least two sequential portions of the received EEG data to substantially match the at least two location EEG data sets. Additionally, the method includes unlocking the device if the track of the user's point of focus substantially matches a predetermined track of the user's point of focus.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Figure 1A:
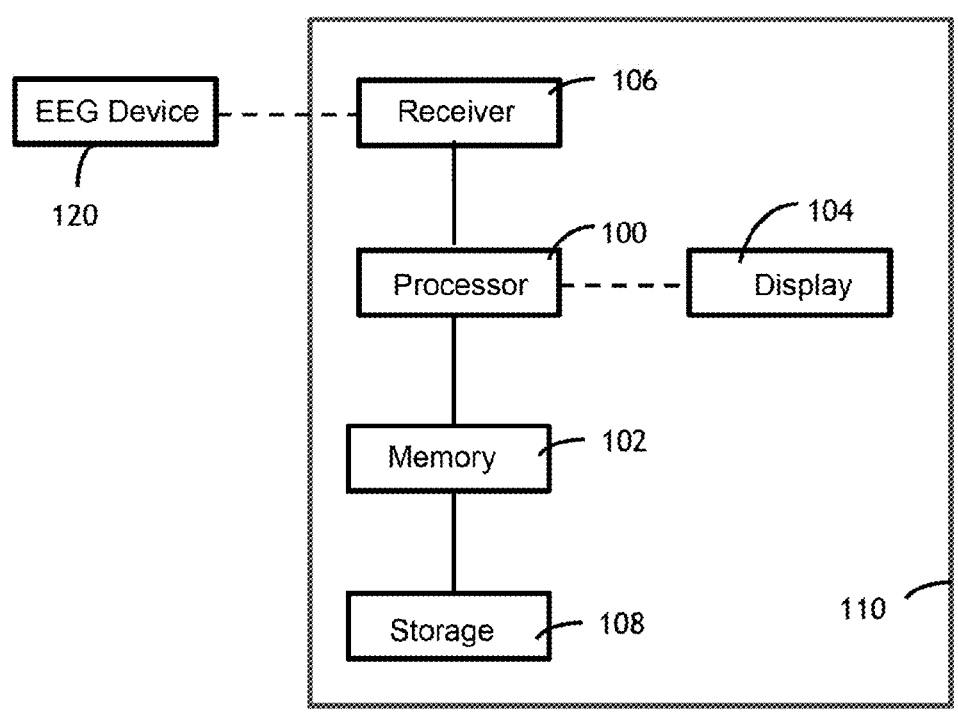
FIG. 1A shows a block diagram of an exemplary computing device of an embodiment of the present invention.

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

In one embodiment, the processor 100 of the computing device 110 may flash an on-screen or off-screen indicator 702. When the user observes the flashing on-screen or off-screen indicator 702, the processor 100 of the computing device 110 may receive EEG data from an EEG device 120. The processor 100 determines if the EEG data substantially matches recorded or predetermined activation EEG data associated with the user focusing on a particular flashing frequency. Received EEG data may be or may include brain signals, optic nerve signals, brainwaves, brainwave patterns, or the like; likewise, predetermined or recorded EEG data may include brain signals, optic nerve signals, brainwaves, brainwave patterns, or the like. If the processor determines that the EEG data substantially matches the activation EEG data, the processor 100 activates a power mode change or operational mode change, which may result in providing power to the display 104. After the power mode change or the operational mode change is activated and the display 104 is powered, the user may begin an unlock sequence to unlock the GUI of the computing device 110. The user may complete the unlock sequence of the GUI of the computing device 110 associated with the display 104 without the need of either hand by looking at flashing regions, indicators, or icons in a particular sequence or by moving the user's point of focus across the display 104 to substantially match EEG data, brain signals, optic nerve signals, brainwaves, or brainwave patterns associated with a predetermined track of the point of focus. The processor 100 of the computing device 110 may display a GUI on the display 104 with a plurality of flashing regions 202, 204, 206, and 208 or a plurality of flashing icons or indicators 801-809 flashing at different frequencies. As a user looks at the plurality of flashing regions, indicators, or icons, each flashing frequency causes the user to produce distinct EEG data, brain signals, optic nerve signals, brainwaves, and/or brainwave patterns. The user's brain signals, optic nerve signals, brainwaves, and/or brainwave patterns are detected by the electrodes 402 of the EEG device and interpreted by the processor 100 of the computing device 110. The processor 100 unlocks the computing device 110 if the EEG data substantially matches recorded or predetermined EEG data, brain signals, brainwaves or brainwave patterns.

Embodiments may include a computing device communicatively coupled with an EEG device. The computing device may comprise a computer (such as a desktop computer, a notebook computer, a tablet computer, or the like), a smart phone device, a hand-held computing device (such as a GPS computing device, a weapon-attached computing device, or the like), a vehicle computer device (such as an automobile computer device or system, a cockpit computer device or system, or the like), a wearable computing device (such as a wrist-mounted computing device, helmet-mounted computing device, a visor-attached computing device, a clothing-integrated computing device, or the like), an implanted computing device, or the like. The computing device may include some or all of one or more processors, memory, a battery, a transmitter, a receiver, an antenna, and storage. The computing device may include a display or may be configured to display a graphical user interface (GUI) on a display communicatively coupled with the computing device. The memory may comprise Random Access Memory (RAM), flash memory, or the like. The storage may comprise a hard disk drive (HDD), a solid state drive (SSD), flash memory, or the like. The transmitter may be communicatively coupled to the processor and may be configured to send or transmit signals through radio transmissions or the like. For example, the transmitter may transmit short-wavelength radio transmissions over short distances, and may be configured to use a Bluetooth standard, such as Bluetooth 1.0, 1.0B, 1.1, 1.2, 2.0, 2.1, 3.0, 4.0, or the like. The receiver may be communicatively coupled with the processor and may be configured to receive signals through radio transmissions or the like. For example, the receiver may receive short-wavelength radio transmissions transmitted over short distances, and may be configured to use a Bluetooth standard, such as Bluetooth 1.0, 1.0B, 1.1, 1.2, 2.0, 2.1, 3.0, 4.0, or the like. The display may be communicatively coupled with one or more processors and may be configured to display a GUI. The display may comprise an on-device display, a device-coupled display, a touch-screen display, a projection display, a three-dimensional display, a heads up display, a cockpit display, a vehicle display, a dashboard display, a head down display, a retina-projected display, a visor display, a helmet-mounted display, or the like.

The computing device may receive EEG data from an EEG device. The EEG data may be or may include brain signals, optic nerve signals, brainwaves, brainwave patterns, or the like. The EEG device may include, for example, some or all of one or more EEG sensors, a processor, memory, storage, a battery, a transmitter, a receiver, and a stabilizing structure. An EEG sensor 106 generally comprises a plurality of electrodes 402 capable of detecting electrical activity in a person's brain when placed at specific points on the person's head. The stabilizing structure may comprise, for example, a headband, a helmet, a cap, or the like configured to hold the components of the EEG device in place in relation to the user's head.

The one or more EEG sensors may be communicatively coupled with a processor of the EEG device through wired/cabled connectivity or through wireless connectivity. For example, the one or more EEG sensors may communicate as a wireless network with a receiver of the EEG device, wherein the receiver is communicatively coupled with the processor of the EEG device. The processor of the EEG device may be communicatively coupled with a transmitter of the EEG device. The EEG device may be communicatively coupled with the computing device through a wired or cabled connection. For example, the transmitter of the EEG device may transmit EEG data to the computing device. In other implementations, each EEG sensor of the network of EEG sensors may individually communicate with a receiver of the computing device.

The transmitter of the EEG device may be communicatively coupled to the processor and may be configured to send or transmit signals through radio transmissions or the like to the computing device. For example, the transmitter may transmit short-wavelength radio transmissions over short distances, and may be configured to use a Bluetooth standard, such as Bluetooth 1.0, 1.0B, 1.1, 1.2, 2.0, 2.1, 3.0, 4.0, or the like. The receiver of the EEG device may be communicatively coupled with the processor of the EEG device and may be configured to receive signals through radio transmissions or the like. For example, the receiver of the EEG device may receive short-wavelength radio transmissions transmitted over short distances, and may be configured to use a Bluetooth standard, such as Bluetooth 1.0, 1.0B, 1.1, 1.2, 2.0, 2.1, 3.0, 4.0, or the like. Other components (e.g., the one or more EEG sensors) of the EEG device may also be configured to transmit or receive signals through radio transmissions or the like; the other components of the EEG device may be configured to transmit or receive short-wavelength radio transmissions transmitted over short distances, and may be configured to use a Bluetooth standard, such as Bluetooth 1.0, 1.0B, 1.1, 1.2, 2.0, 2.1, 3.0, 4.0, or the like.

In some, implementations the EEG device may include the one or more EEG sensors. The one or more EEG sensors may be individually attachable or affixable to a user's head or scalp such as through temporary medical glue, long-lasting medical glue, permanent stitches, or dissolving stitches. Each of the EEG sensors may include a wireless transmitter configured to transmit to a primary EEG sensor or may be wired to the primary EEG sensor; that is, each of the other EEG sensors may be communicatively coupled to the primary EEG sensor.

One of the one or more EEG sensors may include the primary EEG sensor. The primary EEG sensor may include a receiver, a transmitter, and/or a processor. The receiver of the primary EEG sensor may receive EEG data from the other EEG sensors. The primary EEG sensor may further receive other information from the other EEG sensors or from another source, such as another computing device or a human operator; for example, this other information may include the cranial location or neurological location of the other EEG sensors. In some implementations, the processor of the primary EEG sensor may aggregate, congregate, coalesce, or merge the EEG data into composite EEG data of the network of EEG sensors and transmit the composite EEG data to the computing device; in other implementations, the primary EEG sensor may forward the EEG data received from the one or more EEG sensors to the computing device.

In yet another implementation, the EEG device may comprise an EEG relay device communicatively coupled with a network of EEG sensors. The intermediate relay device may be wired or wirelessly communicatively coupled with the network of EEG sensors. The EEG relay device may receive EEG data from the network of EEG sensors. The EEG relay device may, for example, be worn around the neck (e.g., a necklace or a pendant on a necklace), wrist (e.g., a bracelet or a wrist-band), or other locations on a user's body or be located away from the user's body. The EEG relay device may aggregate, congregate, coalesce, or merge the EEG data into composite EEG data of the network of EEG sensors and transmit the composite EEG data to the computing device or other computing devices; in other implementations, the EEG relay device may forward the EEG data received from the EEG sensors directly to the computing device or other computing devices.

Referring to FIG. 1A, a block diagram of a computing device 110 communicatively coupled with an EEG device 120 is shown. The computing device 110 may include a processor 100 for executing computer code. The processor 100 may be connected to memory 102 or storage 108 for storing the computer code. The processor 100 may be connected to or may be configured to connect to a display 104 for displaying a user interface. The processor 100 may also be connected to a receiver 106 configured to receive EEG data or other data from the EEG device 120. Storage 108 may be communicatively coupled or connected to the memory 102 or the processor 100. The EEG data may be or may include brain signals, optic nerve signals, brainwaves, brainwave patterns, or the like.

Figure 1B:
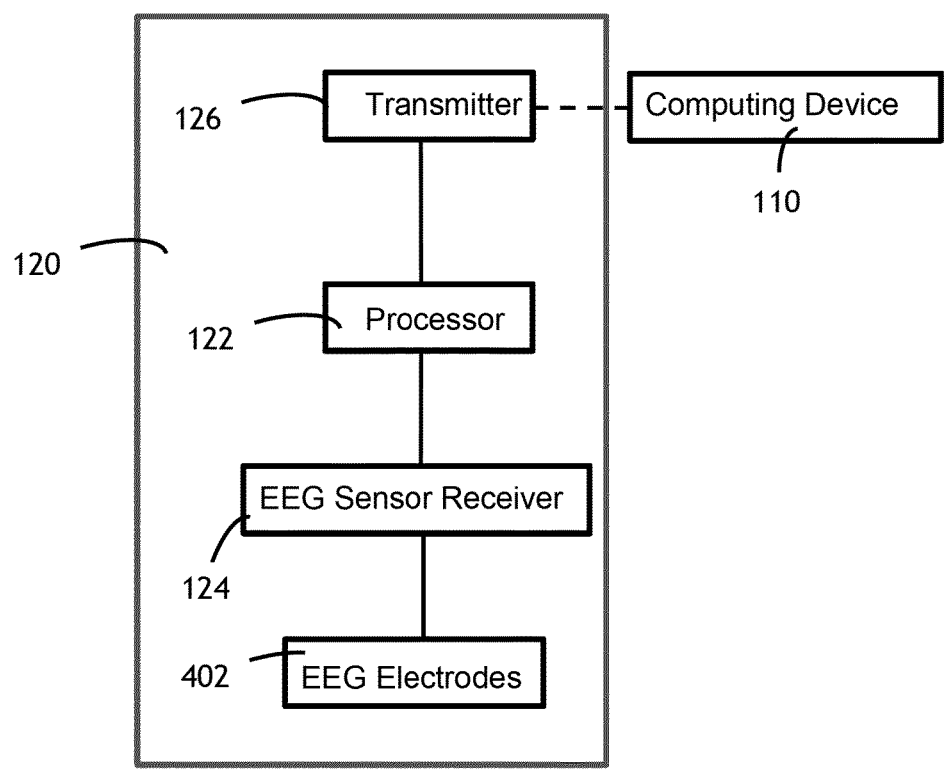
FIG. 1B shows a block diagram of an exemplary EEG device of an embodiment of the present invention.

Referring to FIG. 1B, a block diagram of an embodied EEG device 120 communicatively coupled with a computing device 110 is shown. The EEG device 120 may include a processor 122 for executing computer code. The EEG device 120 may also include memory or storage (not shown). EEG sensors 402 may be configured to detect, sense, and/or record electrical activity along the scalp by measuring voltage fluctuations resulting from ionic current flows within the neurons of the brain. EEG sensors 402 may be communicatively coupled to an EEG receiver 124. The EEG sensor receiver 124 may be communicatively coupled to the processor 122. The processor 122 may be communicatively coupled to a transmitter 126. The transmitter 126 may be configured to transmit EEG data or other data to the computing device 110.

Figure 2:
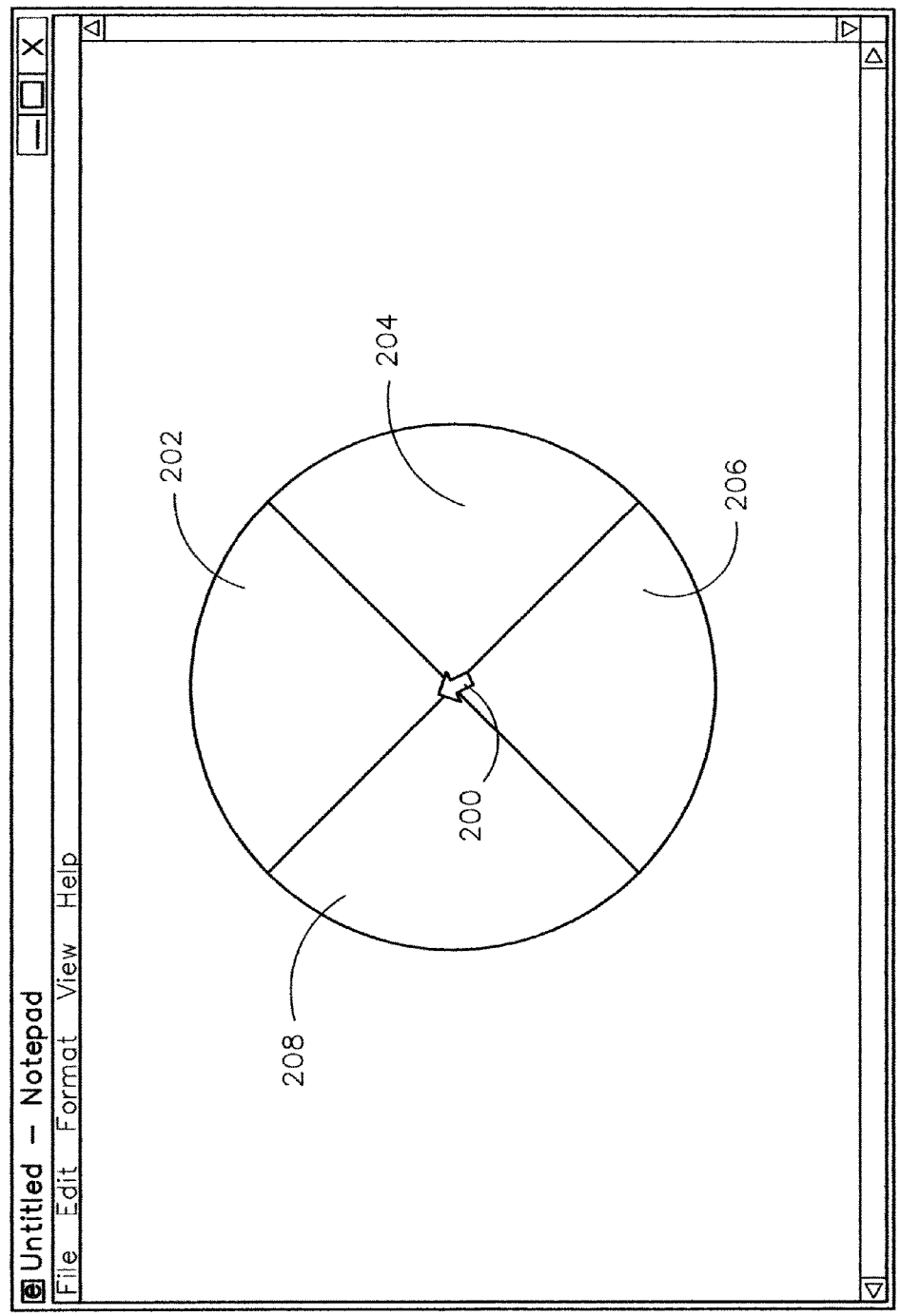
FIG. 2 shows a graphical user interface useful for implementing an embodiment of the present invention.

Referring to FIG. 2, an exemplary GUI is shown. The GUI may include a pointer 200 and a plurality of flashing regions 202, 204, 206, and 208. FIG. 2 depicts a plurality of flashing regions 202, 204, 206, and 208 forming a circle and delineated by visible lines. In actual application, the flashing regions 202, 204, 206, and 208 may be consciously imperceptible to the user, with no obvious delineation between flashing regions 202, 204, 206, and 208 or areas of the GUI outside the flashing regions 202, 204, 206, and 208.

Each flashing region 202, 204, 206, and 208 may flash at a certain frequency distinct from the frequency of each other flashing region 202, 204, 206, and 208. Two flashing frequencies are distinct when the EEG data, brain signals, or brainwave patterns of a person looking at one flashing frequency are distinguishable from the EEG data, brain signals, brainwaves, or brainwaves patterns of the same person looking at the other flashing frequency as EEG data, brain signals, or brainwaves are measured by EEG.

Research has shown that different frequencies of flashing light result in distinct brain signals, brainwaves, and brainwave patterns in the midline occipital region of the brain, readable by EEG. When an individual looks at a certain frequency of flashing light, the individual's brainwaves will appear different from the same individual's brainwaves when looking at a different frequency of flashing light. That observation is true even when the flashing is consciously imperceptible to the individual.

The flashing regions 202, 204, 206, and 208 may be organized as quadrants with a common point centered at the pointer 200. By looking at a particular flashing region 202, 204, 206, and 208, a user may direct the relative movement of the pointer. For example, a first region 202, positioned above the pointer 200 may flash at a frequency of nine hertz while a second region 204 may flash at a frequency of nine and one quarter hertz. In this example, a frequency differentiation of 0.25 hertz is specified; in practice, any minimum frequency differentiation capable of producing distinguishable brain signals, brainwaves, or brainwave patterns may be used. For example, when a user looks at the first region 202, the user produces certain brainwave patterns different from the user's brainwave patterns when the user looks at the second region 204. The user's brain signals, optic nerve signals, brainwaves, and/or brainwave patterns can be measured and distinguished with EEG. When the user's brain signals, brainwaves, or brainwaves, as measured by EEG, indicate that the user is looking at the first region 202, the computer utilizing the GUI may move the pointer 200 up, toward the first region 202. The computer may also reposition every other region 204, 206, and 208 to maintain a quadrant layout of the flashing regions 202, 204, 206, and 208 centered at the pointer 200. If the user's brain signals, optic nerve signals, brainwaves, and/or brainwave patterns, as measured by EEG, subsequently indicate that the user is looking at the second region 204, the computer utilizing the GUI may move the pointer 200 right, toward the second region 204. The computer may also reposition every other region 202, 206, and 208 to maintain a quadrant layout of the flashing regions 202, 204, 206, and 208 centered at the pointer 200.

While FIG. 2 depicts a GUI having four flashing regions 202, 204, 206, and 208 divided into quadrants, one skilled in the art will appreciate that different numbers of regions in different configurations may be desirable provided the regions are dynamically repositionable, and remain in the same position relative to a pointer 200. One skilled in the art will also appreciate that every portion of the GUI may be incorporated into one of the flashing regions 202, 204, 206, and 208 such that flashing regions 202, 204, 206, and 208 cover the entire GUI.

Flashing regions 202, 204, 206, and 208 in a GUI, such as depicted in FIG. 2, may maintain their relative positions with relation to each other, but rotate about the pointer 200. By rotating the flashing regions 202, 204, 206, and 208 between measurement periods, a processor 100 may correlate different brain signal and/or brainwave measurements from different brain signal and/or brainwave measurement periods to determine where in a particular quadrant a user is looking. Measurement periods may be some frequency below the Nyquist limit of the shortest frequency flashing region 202, 204, 206, or 208.

Still referring generally to FIG. 2, embodiments can allow a user to move a pointer on a display without touching the display or allow a computing device to track a point of focus of the user across the display without the user being required to touch the screen. For example, a computer implementing a GUI may display a plurality of flashing regions 202, 204, 206, and 208 of different frequencies. Each flashing region 202, 204, 206, and 208 may be positioned relative to a pointer 200 or a point of focus while still being dynamically repositionable relative to the rest of the GUI. The EEG device 120 may sense, detect, or measure EEG data, brain signals, optic nerve signals, brainwaves, and/or brainwave patterns of a user. The computing device 110 may receive EEG data from the EEG device 120. Because the different frequencies of each flashing region 202, 204, 206, and 208 induce distinct brain signals, optic nerve signals, brainwaves, and/or brainwave patterns in the user detectable by the EEG device 120, the processor 100 of the computing device 110 may then determine which flashing region 202, 204, 206, or 208 the user is currently or was looking at based on the distinct brain signal(s), brainwave(s), and/or brainwave pattern(s) detected by the EEG device 120. While brain signals, optic nerve signals, brainwaves, and/or brainwave patterns for a particular user are distinct for different flashing frequencies, brain signals, optic nerve signals, brainwaves, and/or brainwave patterns may be unique to a particular user and may require an initiation process to provide a processor 100 of a computing device a data set sufficient to differentiate the user's brain signals, optic nerve signals, brainwaves, and/or brainwave patterns. Such a data set may be stored in memory 102 or storage 108 connected to the processor 100 of the computing device 110. Once the processor 100 of the computing device 110 determines which of the flashing region 202, 204, 206, and 208 the user is currently or was looking at, the processor 110 may move the pointer 200 or track the point of focus of the user some distance in the direction indicated by such flashing region 202, 204, 206, or 208 and reposition the flashing regions 202, 204, 206 and 208 accordingly. This process may continuously repeat to update the position of the pointer 200 or further track the point of focus of the user.

Additionally, a computing device 110 may process user selections by processing EEG data of the user. For example, a computing device 110 can implement a GUI on a display 104 to display at least one flashing region 202, 204, 206, and 208 having one or more specific frequencies. An EEG device 120 may sense, measure, or detect EEG data or brain signals, optic nerve signals, brainwaves, and/or brainwave patterns of a user and may send EEG data to the computing device 110. The processor 100 of the computing device 110 may process the EEG data of the user. A user may interrupt his visual perception of a flashing frequency by blinking for some predefined duration. The processor 100 of the computing device 110 may determine that an interruption of the user's view of the at least one flashing region 202, 204, 206, and 208 has occurred. The processor 100 of the computing device 110 may then execute a "click" or selection operation in the GUI corresponding to location of the pointer 200 or the user's point of focus. Likewise, the processor 100 of the computing device 110 may interpret two such operations in rapid succession as a "double-click".

Figure 3:
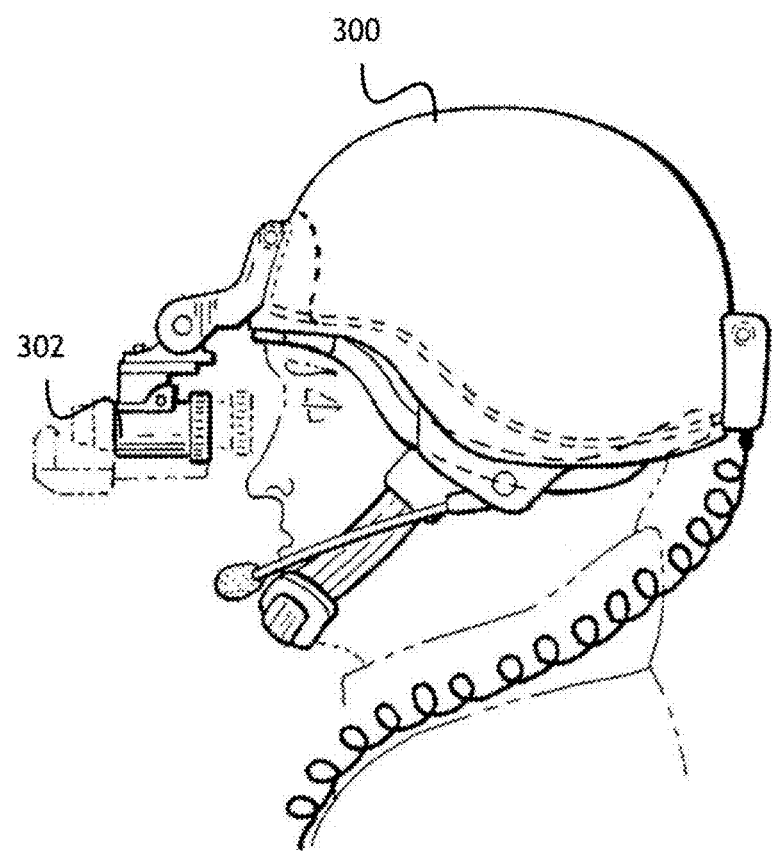
FIG. 3 shows a helmet mounted display useful for implementing embodiments of the present invention.

Referring to FIG. 3, a helmet 300 with a mounted display 302 is depicted. The helmet 300 or the mounted display 302 may include an off-screen indicator (see, e.g., 702 of FIG. 7) which may be located in proximity to the viewable portion of the mounted display 302. EEG electrodes 402 may be incorporated into the helmet 300, such that the electrodes 402 may contact the user's head. In such an implementation, the plurality of electrodes 302 of the helmet may comprise a portion of the EEG device 120. Where such a mounted display 302 incorporates the off-screen indicator 702, a soldier may enable or disable the mounted display 302 or unlock a particular computing device 110 associated with the mounted display 302 without the need of either hand. That is, the soldier may enable or disable the mounted display 302, unlock the computing device 110 associated with the mounted display 302, or begin an unlock sequence by merely looking at the off-screen indicator 702. Focusing on the off-screen indicator 702 triggers an EEG device 120 to send EEG data to the computing device 110 which substantially matches, for example, an activation/enablement brainwave pattern that triggers the enablement of the mounted display 302. If the soldier enables the mounted display 302 and begins an unlock sequence, the soldier can further complete the unlock sequence of the computing device 110 associated with the mounted display 302 without the need of either hand by looking at flashing regions, flashing indicators, or flashing icons displayed on the mounted display 302 or by moving the soldier's point of focus across the mounted display 302 to substantially match a predetermined track of the point of focus.

Figure 4:
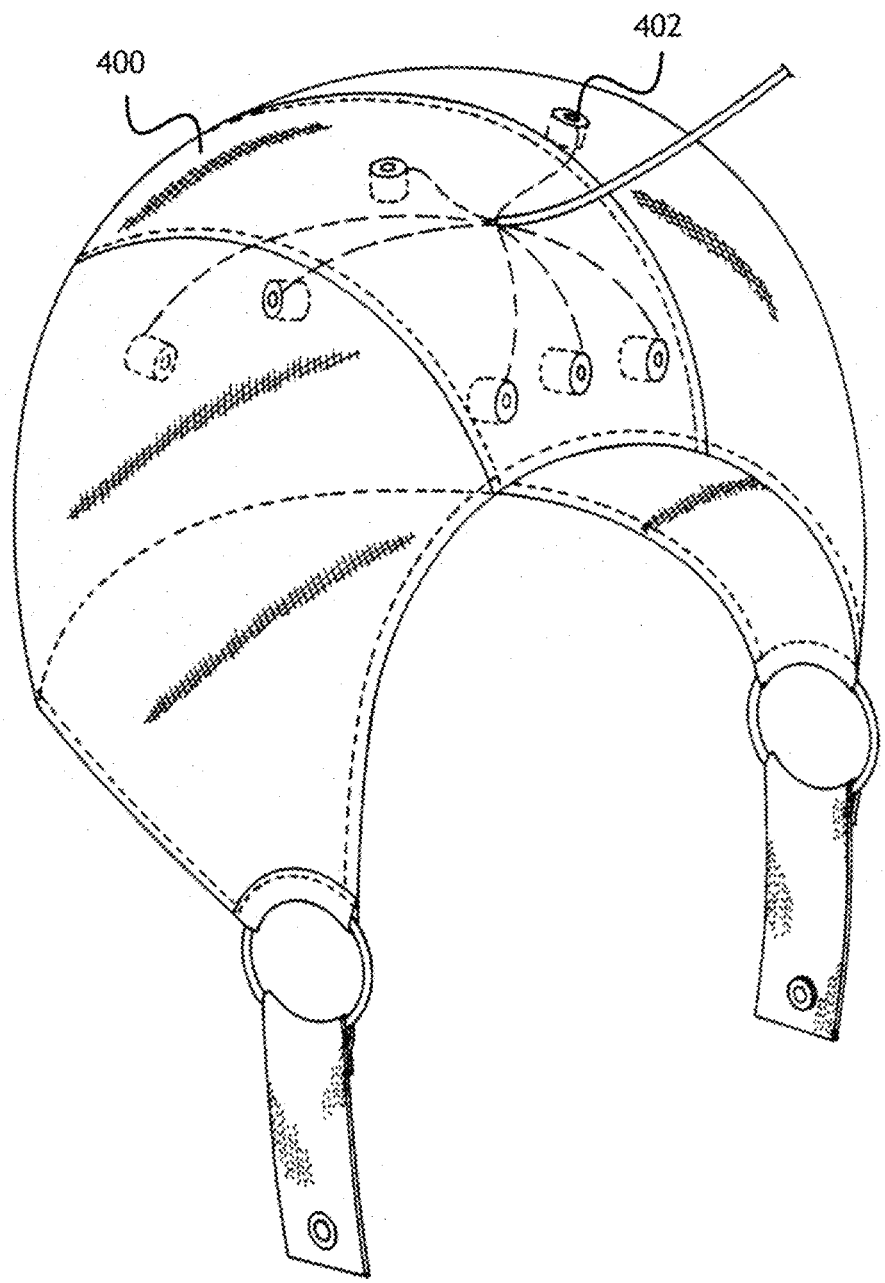
FIG. 4 shows an EEG device useful for implementing embodiments of the present invention.

The soldier's helmet 300 may also incorporate an EEG device 120 with one or more EEG sensors such as depicted in FIG. 4. An EEG sensor generally comprises a plurality of electrodes 402 capable of detecting electrical activity in a person's brain when placed at specific points on the person's head. Each electrode 402 may be individually positioned or incorporated into a cap 400 at specific locations such that each electrode 402 may be in relatively the same location whenever a person puts on the cap 400. EEG data from the EEG electrodes 402 may be sent, transmitted, or communicated to a processor 100 of the computing device 110. The processor 100 of the computing device 110 may interpret the EEG data received from the EEG device 120 to determine if the user is looking at an off-screen indicator 702, a particular flashing region 202, 204, 206, or 208, or a particular flashing icon (see, e.g., 606 or 608 of FIG. 6).

Figure 5:
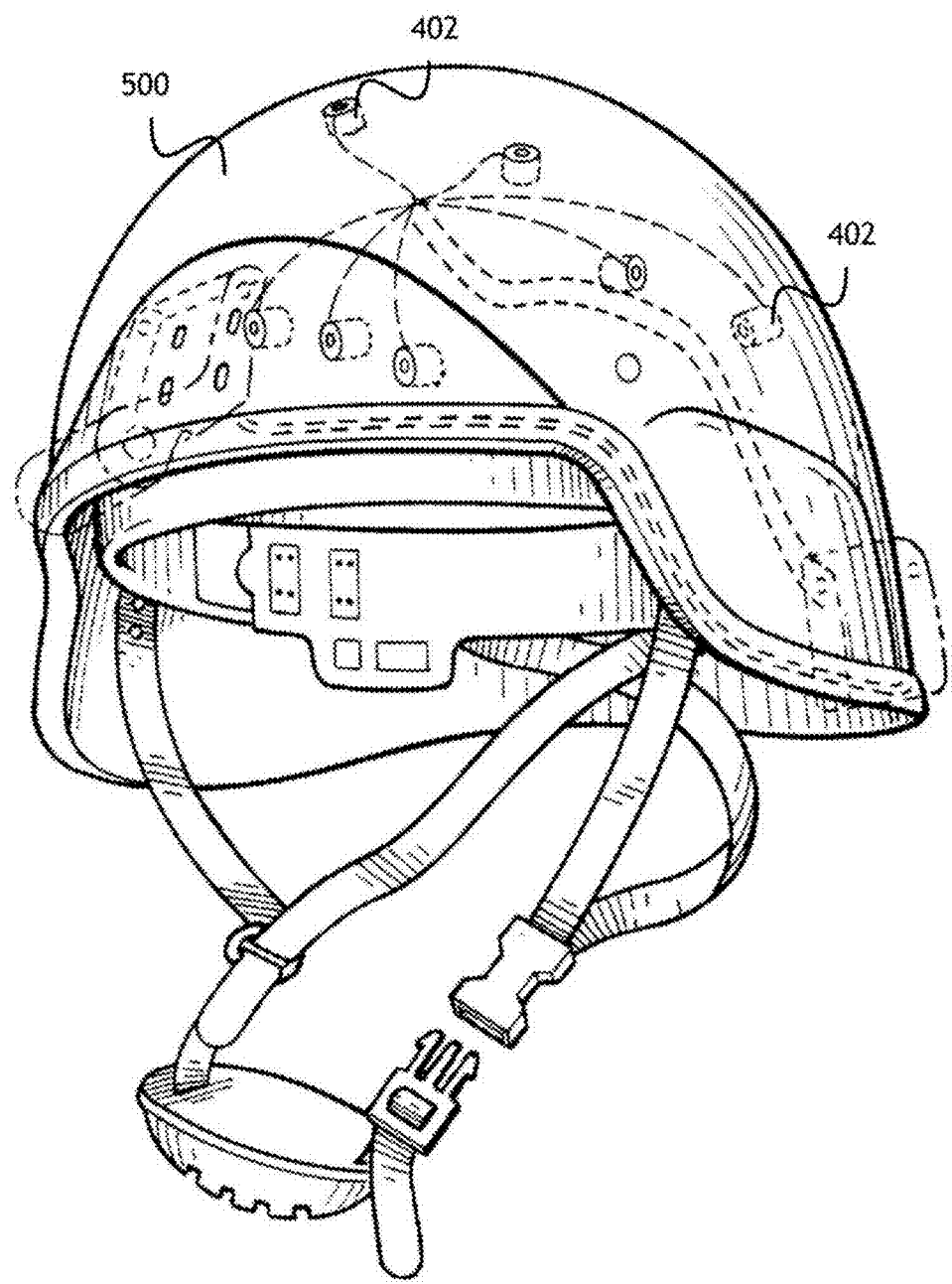
FIG. 5 shows a helmet incorporating EEG sensors useful for implementing embodiments of the present invention.

Referring to FIG. 5, electrodes may be incorporated into a helmet 500. The helmet depicted in FIG. 3 may further incorporate electrodes 402 at fixed locations within the helmet 500, such that the electrodes 402 may contact the user's head. In such an implementation, the plurality of electrodes 402 may comprise a portion of the EEG device 120. A display 104, such as a mounted display 302, may be communicatively coupled to the processor 100 of the computing device 110. The processor 100 of the computing device 110 may flash an on-screen or off-screen indicator 702. When the user observes the flashing on-screen or off-screen indicator 702, the processor 100 of the computing device 110 may activate a power mode change or an operational mode change, which may result, for example, in providing power to the display 104 or 302. After the power mode change is activated and the display 104, 302 powered, the user may begin an unlock sequence to unlock the GUI of the computing device 110. The user may complete the unlock sequence of the GUI of the computing device 110 associated with the display 104 or mounted display 302 without the need of either hand by looking at flashing regions, indicators, or icons in a particular sequence or by moving the user's point of focus across the display 104, 302 to substantially match EEG data, brain signals, optic nerve signals, brainwaves, and/or brainwave patterns associated with a predetermined track of the point of focus. The processor 100 of the computing device 110 may display a GUI on the display 104 or 302 with a plurality of flashing regions 202, 204, 206, and 208 or a plurality of flashing icons or indicators 606 and 608 flashing at different frequencies. As a user looks at the plurality of flashing regions, indicators, or icons, each flashing frequency causes the user to produce distinct brain signals, optic nerve signals, brainwaves, and/or brainwave patterns. The user's brain signals, optic nerve signals, brainwaves, and/or brainwave patterns are detected by the electrodes 402 of the EEG device and interpreted by the processor 100 of the computing device 110. The processor 100 unlocks the computing device 110 if the EEG data substantially matches recorded or predetermined EEG data, brain signals, optic nerve signals, brainwaves, and/or brainwave patterns.

Figure 6:
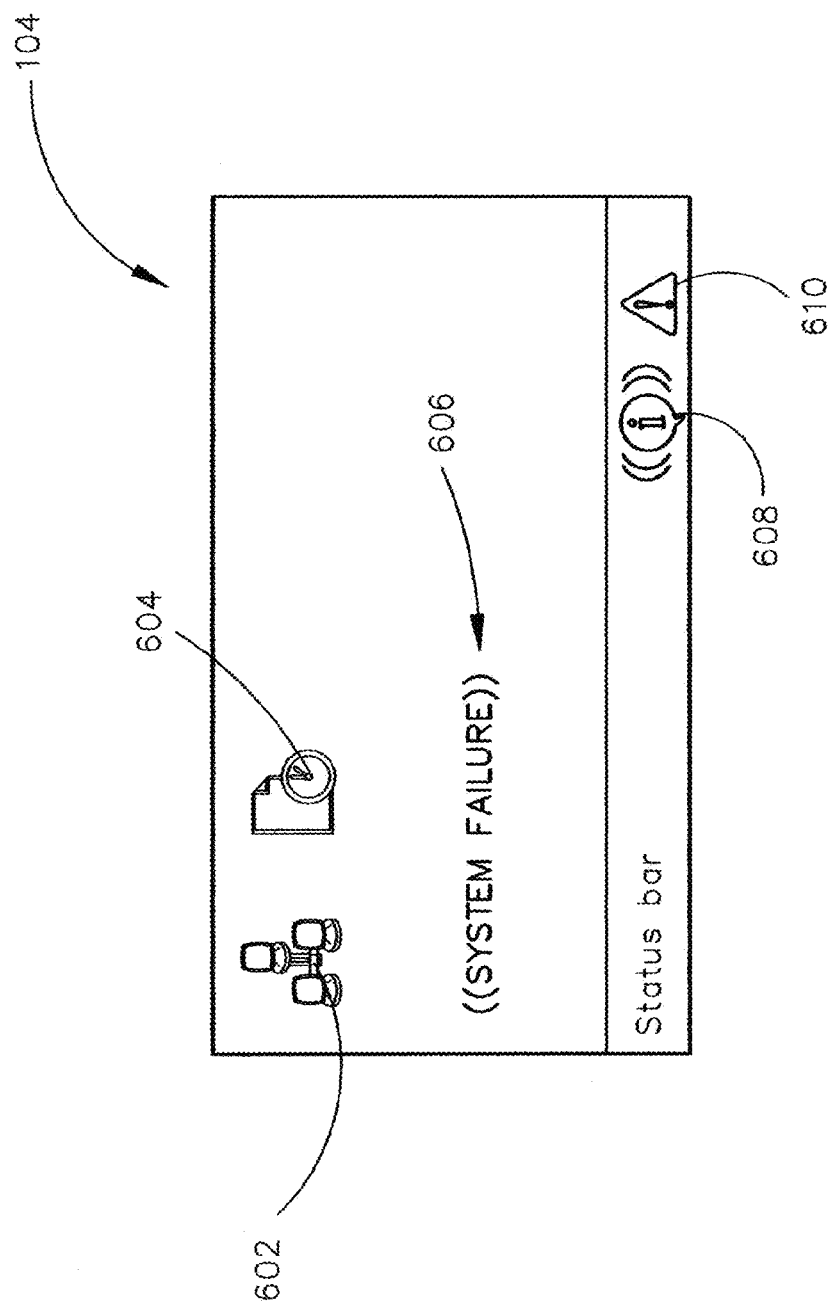
FIG. 6 shows a graphical user interface with flashing icons useful for implementing an embodiment of the present invention.

Referring to FIG. 6, an exemplary display 104 depicting flashing indicators is shown. A display 104 may comprise any mechanism capable of displaying flashing indicators such as a GUI, a heads-up display (HUD), human machine interface (HMI), or a panel of warning lights. The display 104 may include one or more indicators 602, 604, 606, 608, 610, each of the one or more indicators 602, 604, 606, 608, 610 configured to flash. FIG. 6 depicts a plurality of indicators 602, 604, 606, 608, 610, two of the indicators being flashing indicators 606 and 608. In actual application, the flashing of the flashing indicators 606 and 608 may be consciously imperceptible to the user.

The one or more indicators 602, 604, 606, 608, 610 may each be configured to flash at a distinct frequency different from each of the other one or more indicators 602, 604, 606, 608, 610. Two flashing frequencies are distinct when the EEG data, brain signals, optic nerve signals, brainwaves, and/or brainwave patterns of a person observing one flashing frequency are distinguishable from the EEG data, brain signals, optic nerve signals, brainwaves, and/or brainwave patterns of the same person observing the other flashing frequency as brain signals, optic nerve signals, brainwaves, and/or brainwave patterns are measured by EEG.

A display 104 such as shown in FIG. 6 may have a textual flashing indicator 606 or a graphical flashing indicator 608. By observing the textual flashing indicator 606, a user may generate certain brain signals, optic nerve signals, brainwaves, and/or brainwave patterns as compared to when the user is not observing the textual flashing indicator 606. The user's brain signals, optic nerve signals, brainwaves, and/or brainwave patterns can be measured and distinguished with EEG. When the user's brain signals, optic nerve signals, brainwaves, and/or brainwave patterns, as measured by EEG, indicate that the user is observing the textual flashing indicator 606, the computer utilizing the display 104 may recognize that the user has acknowledged the textual flashing indicator 606.

Where a display 104 includes a second flashing indicator, such as the graphical flashing indicator 608 shown in FIG. 6, each of the two flashing indicators 606 and 608 may flash at a distinct frequency. Based on the differences in the user's brain signals, optic nerve signals, brainwaves, and/or brainwave patterns, a computer utilizing the display 104 may determine which of the two flashing indicators 606 and 608 the user is observing and perform various responses.

Still referring generally to FIG. 6, each distinct flashing frequency may produce distinct brain signals, optic nerve signals, brainwaves, and/or brainwave patterns when observed by a user. A sensor, such as an EEG sensor, may then sense the brain signals, optic nerve signals, brainwaves, and/or brainwave patterns of the user. If a processor determines, based on the user's brain signals, optic nerve signals, brainwaves, and/or brainwave patterns, that the user is observing one of the one or more flashing indicators, the processor may then determine which of the one or more flashing indicators the user is observing. The processor may then perform an acknowledgment response associated with the flashing indicator observed by the user. Such acknowledgment response may include logging the user's acknowledgment, beginning a resolution response associated with the issue indicated by the flashing indicator, reducing the prominence of the flashing indicator, or any other appropriate response.

Figure 7:
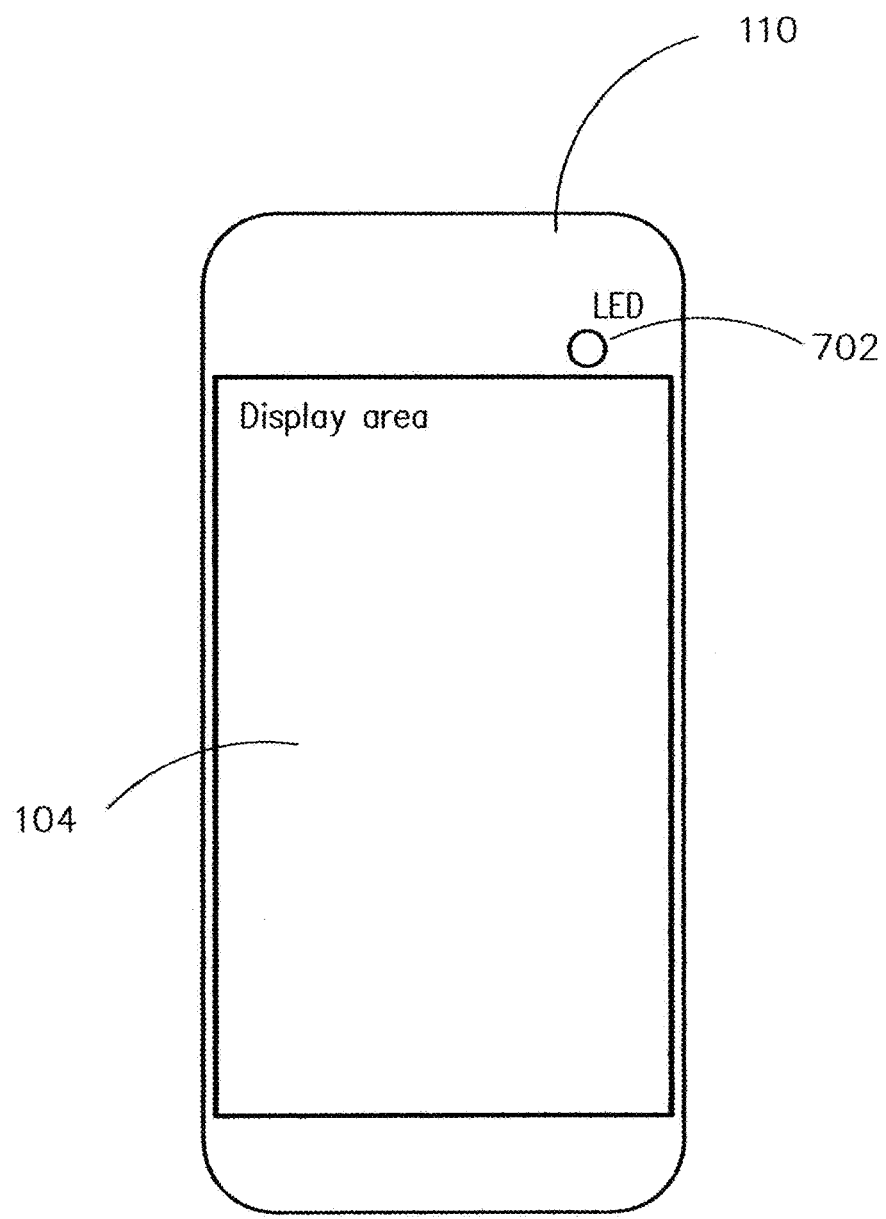
FIG. 7 shows an exemplary computing device with an off-screen flashing indicator of embodiments of the present invention.

Referring to FIG. 7, a computing device 110 is depicted. The computing device 110, for example, may comprise a smart phone device or tablet device. The computing device 110 may include a display 104 and an off-screen indicator 702. In some embodiments, the computing device 110 may include a plurality of off-screen indicators 702. The off-screen indicator 702 may comprise a low-power flashing indicator, such as a light emitting diode (LED), one or more liquid crystal display (LCD) cells (which may be backlit or non-backlit), or the like.

Figure 8:
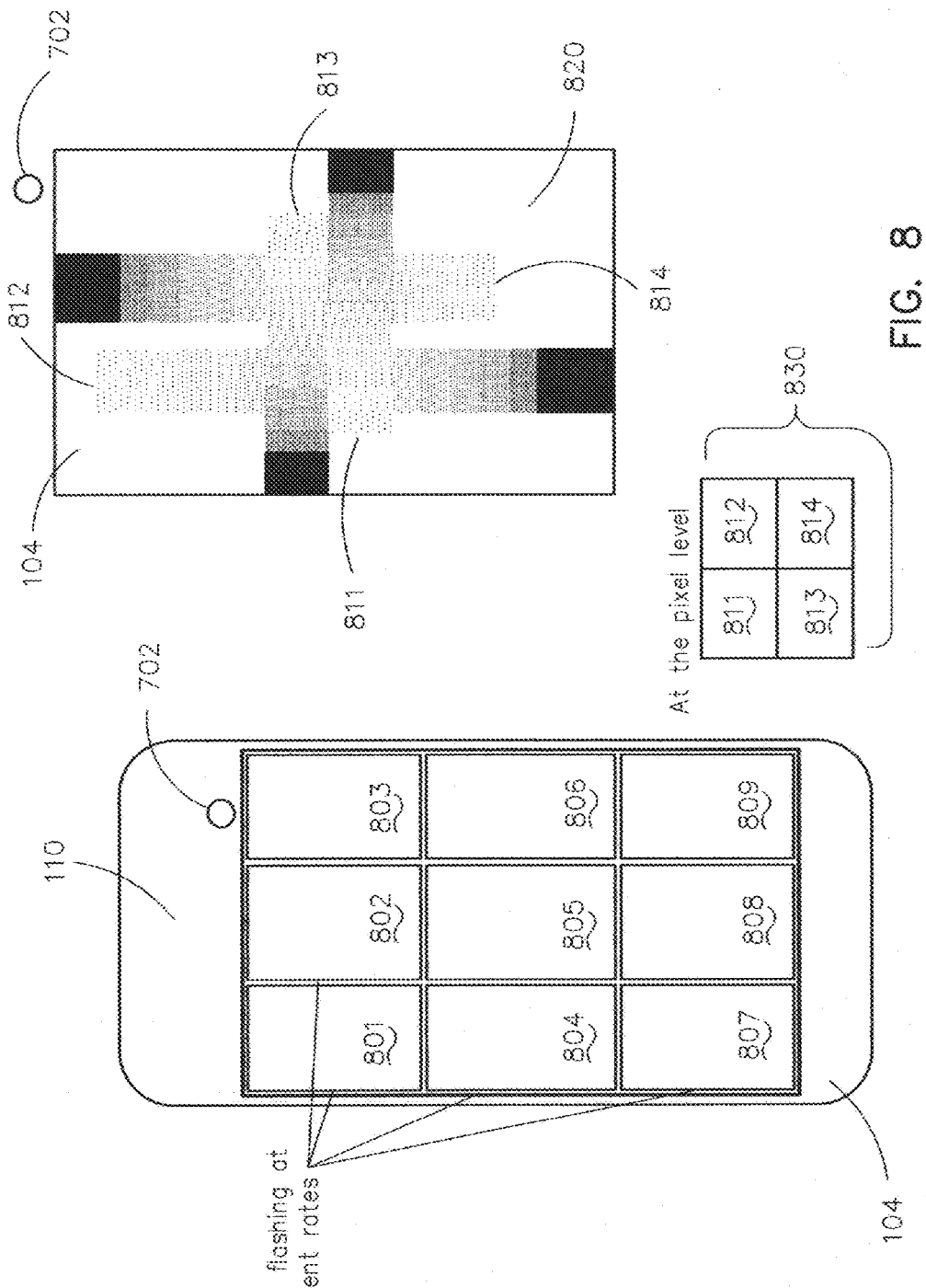
FIG. 8 shows an exemplary computing device with an off-screen flashing indicator and a plurality of flashing regions on the computing device's display of embodiments of the present invention.

In some implementations, the off-screen indicator 702 may be located on the computing device 110 and in proximity to the display 104, such as shown in FIGS. 7-8. In other implementations, the off-screen indicator may be located remotely from the display 104 or remotely from a particular device which includes the display 104; for example, a computing device 110 may be a smart phone device and the flashing off-screen indicator 702 may be located on a panel at a fixed location in a particular room or located in a vehicle (such as on a dashboard of an automobile, in a cockpit of an airplane or helicopter, or the like); such an implementation would allow displays 104 of certain computing devices 110 to be enabled only at certain locations (e.g., in certain rooms or in certain vehicles) for security, safety, or other purposes. In yet other implementations, either or both of the off-screen indicator 702 or the display 104 may be remotely located from the computing device 110; for example, the computing device 110 may comprise a hand-held smart phone device, the flashing off-screen indicator may be located on a vehicle dashboard, and the user's observance of the off-screen indicator may cause the computing device 110 (e.g., the smart phone device) to enable (and in some implementations, output or send graphics or video to) a GUI displayed on an device-detached display 104, such as a visor display, a helmet-mounted display, a wrist-mounted display, or the like.

An embodied computing device 110 may include a low power flashing indicator 702 and a display 104, and the computing device may be communicatively coupled with an EEG device 120. The low power flashing indicator (e.g. a light emitting diode (LED)) may be located in proximity to a display. The flashing indicator may be configured to flash or the computing device may instruct the flashing indicator to flash at a predetermined rate. The EEG device will detect brain signals, optic nerve signals, brainwaves, and/or brainwave patterns of a user and send the EEG data to the computing device. When the computing device receives the EEG data, the computing device will determine if the received EEG data substantially matches recorded, predicted, or predetermined activation/enablement EEG data, brain signals, optic nerve signals, brainwaves, and/or brainwave patterns. When a user observes the flashing indicator, the received EEG data of the user will or should substantially match the recorded, predicted, or predetermined activation/enablement brain signals, optic nerve signals, brainwaves, and/or brainwave patterns associated with the user observing the flashing indicator. As such, the computing device can determine if a user's EEG data substantially matches the brain signals, optic nerve signals, brainwaves, and/or brainwave patterns associated with the user observing various flashing frequencies. When the computing device positively determines that the EEG data of the user substantially matches predetermined, predicted, or recorded activation/enablement brain signals, optic nerve signals, brainwaves, and/or brainwave patterns, the computing device enables the display of the computing device or a display associated with the computing device. This flashing indicator can likewise be used again by the operator to disable the display. On the other hand, the flashing indicator can be shut off once the display is enabled in favor of using only the display for feedback.

It is contemplated that embodiments for enabling a display 104 may be used in numerous environments, circumstances, and configurations. For example, it is contemplated that embodiments of the invention could be used in cockpits where there are multiple displays such that pilot workload and distraction could be reduced by quickly and easily enabling/disabling one or more displays as needed. Additionally, embodiments of the invention may enhance light discipline and save power within a cockpit; for example, in a jet fighter cockpit embodiments would reduce light pollution, reduce pilot workload, and reduce overall power consumption. It is further contemplated that embodiments of the invention may be implemented in conjunction with helmet-mounted displays or visor displays so as to allow hands-free enabling, disabling, activation, or unlocking of displays or devices.

Referring to FIG. 8, the computing device 110 displaying a plurality of flashing regions 801-809 is shown. Each of the flashing regions 801-809 may flash at a distinct rate or frequency. For example, flashing region 801 may flash with a frequency of 9.00 Hz and each of the other flashing frequencies 802-809 may flash at different frequencies. For example, a first flashing region 801 may flash at a frequency of 9.00 hertz (Hz), a second flashing region 802 may flash at a frequency of 9.25 Hz, a third flashing region 802 may flash at a frequency of 9.50 Hz, and so forth. In this example, a frequency differentiation of 0.25 hertz is specified. In practice, any minimum frequency differentiation (e.g., 0.01 Hz, 0.1 Hz, 1.0 Hz, 10 Hz, 100 Hz, 1.000 kHz, 10.00 kHz, or the like) capable of producing distinguishable brainwave patterns may be used. Furthermore, the frequency differentiation between flashing regions 801-809 may be approximately uniformly spaced or non-uniformly spaced.

In further reference to FIG. 8, overlapping flashing regions 820 on the display 104 are depicted with a plurality of blinking regions on the display 104, whereby the flashing frequencies are overlapping 820 on the display 104. For example, various regions of the display may be flashing at different rates and the various regions of the display may be overlapping with other flashing regions of the display such that the rates of the overlapping flashing regions are correlated with the location on the display. For example, a display may have one or more horizontal groups of flashing regions, whereby the horizontal location (or x-axis location) on the display of each flashing region of the one or more horizontal groups of flashing regions is correlated with the flashing rate of the particular horizontal flashing group. Likewise, by example, a display may also have one or more vertical groups of flashing regions, whereby the vertical location (or y-axis location) on the display of each flashing region of the one or more vertical groups of flashing regions is correlated with the flashing rate of the particular vertical flashing group.

For example, the overlapping flashing regions 820 depict a display 104 with two groups of horizontal flashing regions and two groups of vertical flashing regions. A first variable rate 811 and a third variable rate 813 may comprise horizontal flashing rates associated with the horizontal flashing regions. The flashing frequencies of the first variable rate 811 may increase from left to right across the display 104; whereas the flashing frequencies of the third variable rate 813 may increase from right to left across the display 104. A second variable rate 812 and a fourth variable rate 814 may comprise vertical flashing rates associated with vertical flashing regions. The flashing frequencies of the second variable rate 812 may increase from top to bottom across the display 104; whereas the flashing frequencies of the fourth variable rate 814 may increase from bottom to top across the display 104. Each of the variable rates 811-814 may have distinct or different ranges of frequencies and magnitudes of ranges of frequencies such that each horizontal and vertical flashing group has a unique or distinguishable range of frequencies.

For example, the first variable rate 811 may include a range of frequencies from 9.0 Hz to 15 Hz, the second variable rate 812 may include a range of frequencies from 17.0 Hz to 39.0 Hz, the third variable rate 813 may include a range of frequencies from 500 Hz to 600 Hz, and the fourth variable rate 814 may include a range of frequencies from 1.0 kHz to 1.8 kHz. Furthermore, embodiments are contemplated where the overlapping flashing regions 820 may comprise flashing regions at the pixel level 830; that is, each pixel may be a flashing region of overlapping flashing regions (flashing pixels).

A user's point of focus may be determined by substantially matching a portion of EEG data received from an EEG device 120 with brain signals, optic nerve signals, brainwaves, and/or brainwave patterns associated with a relative or composite signal strength of the overlapping 820 of flashing frequencies, wherein the relative or composite signal strength or frequency of the overlapping 820 of flashing frequencies is uniquely associated with a particular location on the display 104. The computing device can track the user's point of focus over time to determine a track of the user's point of focus as the user's point of focus moves across the display 104.

Further implementations may include overlapping regions 820 whereby flashing intensities are overlapping 820 on the display 104, rather than or in combination with overlapping flashing frequencies. For example, various regions of the display may be flashing at different or variable intensities and the various regions of the display may be overlapping with other flashing regions of the display such that the intensities of the overlapping flashing regions are correlated with the location on the display. For example, a display may have one or more horizontal groups of flashing regions, whereby the horizontal location (or x-axis location) on the display of each flashing region of the one or more horizontal groups of flashing regions is correlated with the flashing intensity of the particular horizontal flashing group. Likewise, by example, a display may also have one or more vertical groups of flashing regions, whereby the vertical location (or y-axis location) on the display of each flashing region of the one or more vertical groups of flashing regions is correlated with the flashing intensity of the particular vertical flashing group.

For example, the overlapping flashing regions 820 may include a display 104 with two groups of horizontal flashing regions and two groups of vertical flashing regions. A first variable intensity rate and a third variable intensity rate may comprise horizontal flashing intensity rates associated with the horizontal flashing regions. The flashing intensities of the first variable intensity rate may increase from left to right across the display 104; whereas the flashing intensities of the third variable intensity rate may increase from right to left across the display 104. A second variable intensity rate and a fourth variable intensity rate may comprise vertical intensity rates associated with vertical flashing regions. The flashing intensities of the second variable intensity rate may increase from top to bottom across the display 104; whereas the flashing intensities of the fourth variable rate may increase from bottom to top across the display 104. Each of the variable intensity rates may have distinct or different ranges of intensities and magnitudes of ranges of intensities such that each horizontal and vertical flashing group has a unique or distinguishable range of intensities. Furthermore, embodiments are contemplated where the overlapping flashing regions 820 are implemented at the pixel level 830 whereby each pixel has a particular flashing intensity.

Likewise, a user's point of focus may be determined by substantially matching a portion of EEG data received from an EEG device 120 with brain signals, optic nerve signals, brainwaves, and/or brainwave patterns associated with a relative or composite signal intensity of the overlapping 820 of flashing frequencies, wherein the relative or composite signal intensity of the overlapping 820 of flashing frequencies is uniquely associated with a particular location on the display 104. The computing device can track the user's point of focus over time to determine a track of the user's point of focus as the user's point of focus moves across the display 104.

Some embodiments of the invention include using the plurality of flashing regions 801-809 as shown in FIG. 8 in a method for unlocking a device hands-free. For example, these embodiments may include a user-wearable headset (e.g., a Bluetooth headset) with an EEG sensing system 120 incorporated, wherein the headset with the EEG sensing system 120 is communicatively coupled with a computing device 110, such as a smart phone device. A low-power flashing indicator (e.g. a light emitting diode (LED)) 702 on the computing device 110 may be located in proximity to a display 104. The flashing indicator 702 may be configured to flash or the computing device 110 may execute code causing the flashing indicator 702 to flash at a predetermined rate. When the user focuses briefly on the flashing indicator 702, the headset with the EEG sensing system 120 sends EEG data to the computing device 110. In response, the computing device 110 may determine that the EEG data substantially matches one or more enablement brain signals, optic nerve signals, brainwaves, and/or brainwave patterns and enable the display 104. Once the display 104 is enabled, the computing device 110 may initiate an unlock sequence. In some implementations, such as in a light discipline environment, the user could press a button on the phone to initiate the unlock sequence rather than focusing on the flashing indicator 702.

Upon initiating the unlock sequence, the computing device 110 may display a group of flashing icons or regions 801-809, which may include displayed numeric key buttons or the like, on the display 104. The user would then focus on particular icons or regions of the group of flashing icons or regions 801-809 in a specific sequence (such as an unlock code or password) to complete the unlock sequence. As the user is focusing on the sequence of particular icons or regions, the headset with an EEG sensing system 120 would detect EEG information and send EEG data to the computing device 110. The processor 100 of the computing device 110 would then determine whether the EEG data or sequential portions of the EEG data substantially match a sequence of predetermined brain signals, optic nerve signals, brainwaves, and/or brainwave patterns. If the EEG data or sequential portions of the EEG data substantially match predetermined unlock brain signals, optic nerve signals, brainwaves, and/or brainwave patterns, the processor 100 would unlock the computing device 110 or the display 104.

Some implementations of embodiments for unlocking a device can, alternatively or conjunctively, include flashing the group of indicators or icons 801-809 with a code embedded in the flashing or with a code modulated on the flashing. This code would then be demodulated or detected by the EEG device 120 or the computing device 110 and would allow the unlock sequence to be continued or completed. The use of a code embedded in the flashing or with a code modulated on the flashing adds another layer of security to the password or unlock sequence.

Further embodiments of the invention include using a plurality of flashing regions (202, 204, 206, 208 or 801-809, as shown in FIG. 2 and FIG. 8) or overlapping flashing regions 820 in a method for unlocking a computing device 110 hands-free by detecting and determining eye gestures or tracks of a user's point of a focus across a display 104. Additionally, embodiments of a method for unlocking a computing device 110 hands-free may include moving a cursor or pointer across a display 104 of the computing device 110. These embodiments allow a user to unlock the display 104 of the computing device 110 (such as a smart phone device) hands-free where EEG data corresponding to tracked eye movements across a display 104, which has flashing regions, are the code. These further embodiments may include the user enabling the display 104 by focusing on an off-screen flashing indicator 702, as described above (and further described below). In some implementations, the display 104 may be enabled by pressing a button.

The unlock sequence, procedure, or protocol may be initiated by the user focusing on an off-screen flashing indicator 702, as described above (and further described below); in some implementations, the unlock sequence, procedure, or protocol may be initiated by pressing a button.

Once the unlock sequence, procedure, or protocol is initiated, the user may drive a cursor around on the screen in a predetermined pattern that would be interpreted by the processor 100 of the computing device 110 as the unlock code or pattern to unlock the display 104 or the computing device 110. For example, contemplated unlock codes or patterns could be a simple as driving a cursor 200 from left to right across the screen or more complicated such as driving a cursor 200 in a more complex pattern (such as a figure eight pattern, a script pattern of the user's initials, or the like). One drawback to driving a cursor 200 around a display 104 may be that the unlock pattern can be observed by a bystander. A more secure implementation which can maintain the secrecy of the user's unlock pattern while keeping the user's hands free, may include determining the user's point of focus on the display 104 and tracking the user's point of focus as the point of focus moves across the display 104. This more secure method may include flashing a plurality of blinking regions on the screen whereby the plurality of flashing regions overlap 820 such that the point of focus can be determined by the relative signal strength of the overlapping of flashing frequencies received. In the more secure method, nothing needs to be displayed on the display 104 so as to prevent someone from ascertaining the user's unlock pattern.

It is contemplated that embodiments for unlocking a device may be used in numerous environments, circumstances, and configurations. For example, it is contemplated that the method of unlocking a device could be used in helmet mounted displays, in commercial systems, and cockpit displays to ensure that only authorized personnel (such as pilots) can gain access to a particular user interface or human machine interface (such as controls, or an enabled GUI of display, or the like).

Figure 9:
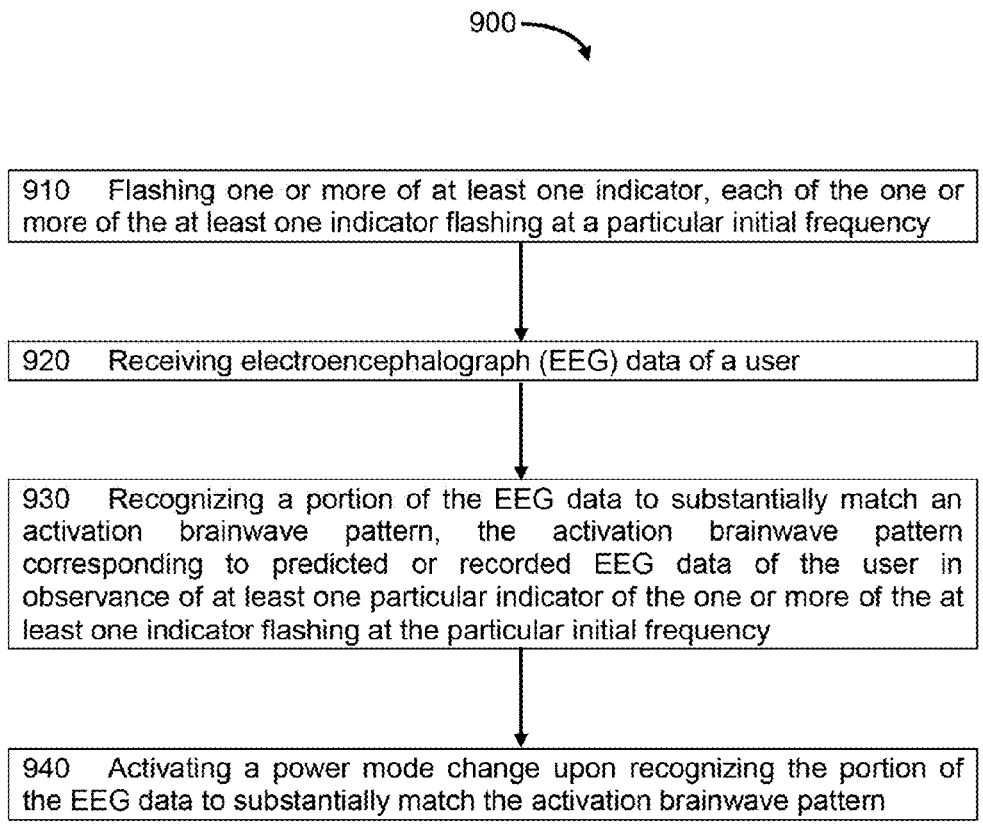
FIG. 9 shows a box diagram associated with an embodied method for enabling a display hands-free.

Referring to FIG. 9, an embodied method 900 associated with activating an operational mode change on a device 110, is depicted. The operational mode change may be or may include a power mode change, enablement of a display, disablement of the display, an alteration of the appearance of a display (such as a change to the brightness of a display), or the like. It is contemplated that embodiments of the method 900 may be performed by a processor, software or firmware executed on a computing device, other computing devices, other computer components, or on other hardware, software, firmware, or middleware. The method 900 may include any or all of steps 910, 920, 930, or 940, and it is contemplated that the method 900 may include additional steps as disclosed throughout, but not explicitly set forth in this paragraph. Further, it is fully contemplated that the steps of method 900 may be performed concurrently or in a non-sequential order.

The method 900 may include a step 910, wherein the step 910 may include one or more of at least one indicator, each of the one or more of the at least one indicator flashing at a particular initial frequency. In some embodiments, one or more of the at least one indicator may comprise an off-screen indicator, such as an LED, configured for flashing. Additionally, one or more of the at least one indicator may comprise an on-screen flashing indicator or on-display flashing indicators, such as a flashing portion or region of a display; for example, the flashing portion or region of the display may comprise at least one pixel of the display flashing at a particular flashing frequency. In some embodiments of the method 900, the step 910 may further comprise flashing one or more of the at least one indicator, each of the one or more of the at least one indicator flashing at dynamically changing frequencies over time. In other embodiments of the method 900, the step 910 may also comprise flashing one or more of the at least one indicator, each of the one or more of the at least one indicator flashing at dynamically changing frequencies over time, the dynamically changing frequencies being cyclically repeated as dynamic frequency cycles such that the user's observance of less than two dynamic frequency cycles is sufficient for recognizing whether received EEG data is a substantial match to predetermined or recorded EEG data.

The method 900 may also include a step 920, wherein the step 920 may include receiving electroencephalograph (EEG) data of a user. The EEG data may be received from an EEG device 120.

The method 900 may further include a step 930, wherein the step 930 may include recognizing a portion of the received EEG data to substantially match activation EEG data, the activation EEG data corresponding to predicted or recorded EEG data of the user in observance of at least one particular indicator of the one or more of the at least one indicator flashing at the particular initial frequency.

The method 900 may additionally include a step 940, wherein the step 940 may include activating an operational mode change upon recognizing the portion of the EEG data to substantially match the activation EEG data. The operational mode change may be or may include a power mode change, enablement of a display, disablement of the display, a change to the brightness of a display, or the like.

In some embodiments of the method 900, the step 930 may comprise recognizing a portion of the received EEG data to substantially match activation EEG data, the activation EEG data corresponding to predicted or recorded EEG data of the user in observance of at least one particular indicator of the one or more of the at least one indicator flashing at the particular initial frequency, wherein the particular initial frequency is associated with producing anomalistic resultant EEG data of the user, the anomalistic resultant EEG data at least substantially biometrically unique to the user. In other embodiments of the method 900 the step 930 may comprise recognizing a portion of the received EEG data to substantially match activation EEG data, the activation EEG data corresponding to predicted or recorded EEG data of the user in observance of at least one particular indicator of the one or more of the at least one indicator flashing at the particular initial frequency, wherein the particular initial frequency is associated with producing archetypal resultant EEG data, the archetypal resultant EEG data at least substantially biometrically typical of all users.

Additional steps of method 900 are contemplated, though they are not specifically depicted in FIG. 9.

For example, the method 900 may also include a step (not shown) of subsequently recognizing a subsequent portion of the received EEG data to substantially match execution EEG data, the execution EEG data corresponding to predicted or recorded EEG data of the user in observance of at least one particular indicator of the one or more of the at least one indicator flashing at the initial frequency or a subsequent frequency; and a step (not shown) of executing an action upon subsequently recognizing the subsequent portion of the received EEG data to substantially match the execution EEG data. For example, the step of executing an action may include disabling a user interface upon subsequently recognizing a subsequent portion of the received EEG data to substantially match the execution EEG data or altering an appearance of a user interface upon subsequently recognizing a subsequent portion of the received EEG data to substantially match execution EEG data.

The method 900 may further include the steps (not shown) of changing the particular initial frequency of at least one particular indicator of the one or more of the at least one indicator; and flashing the at least one particular indicator of the one or more of the at least one indicator at one or more different changed frequencies.

Some embodiments of the method 900 may also include unlocking the device.

Figure 10:
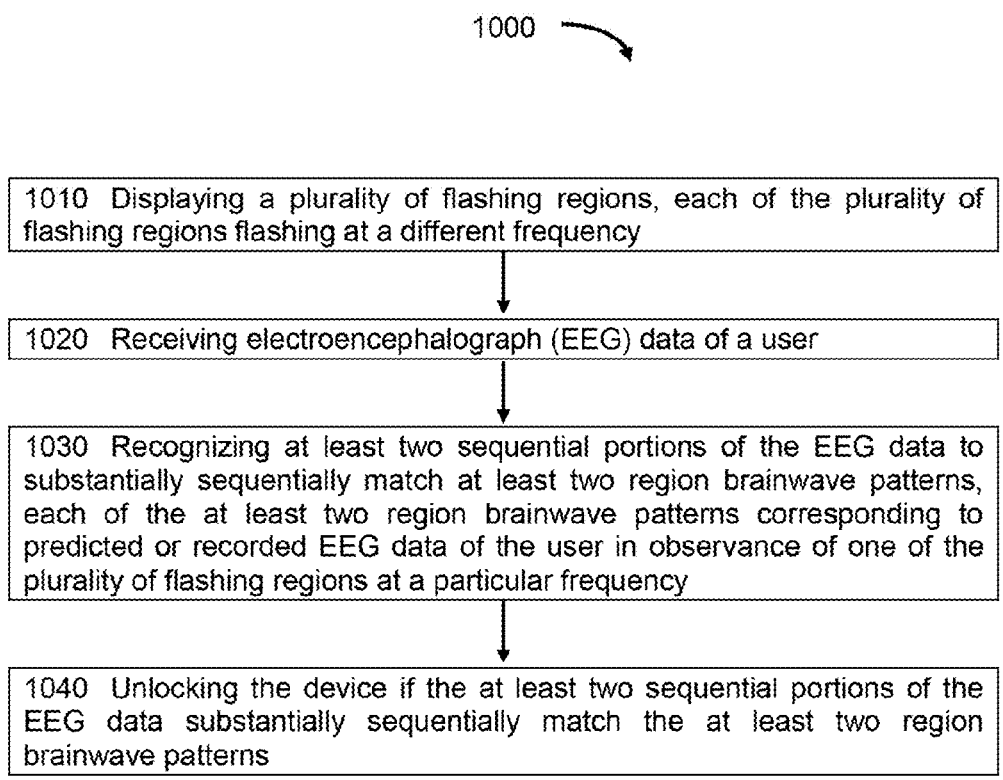
FIG. 10 shows a box diagram associated with an embodied method for unlocking a device hands-free.
Figure 11:
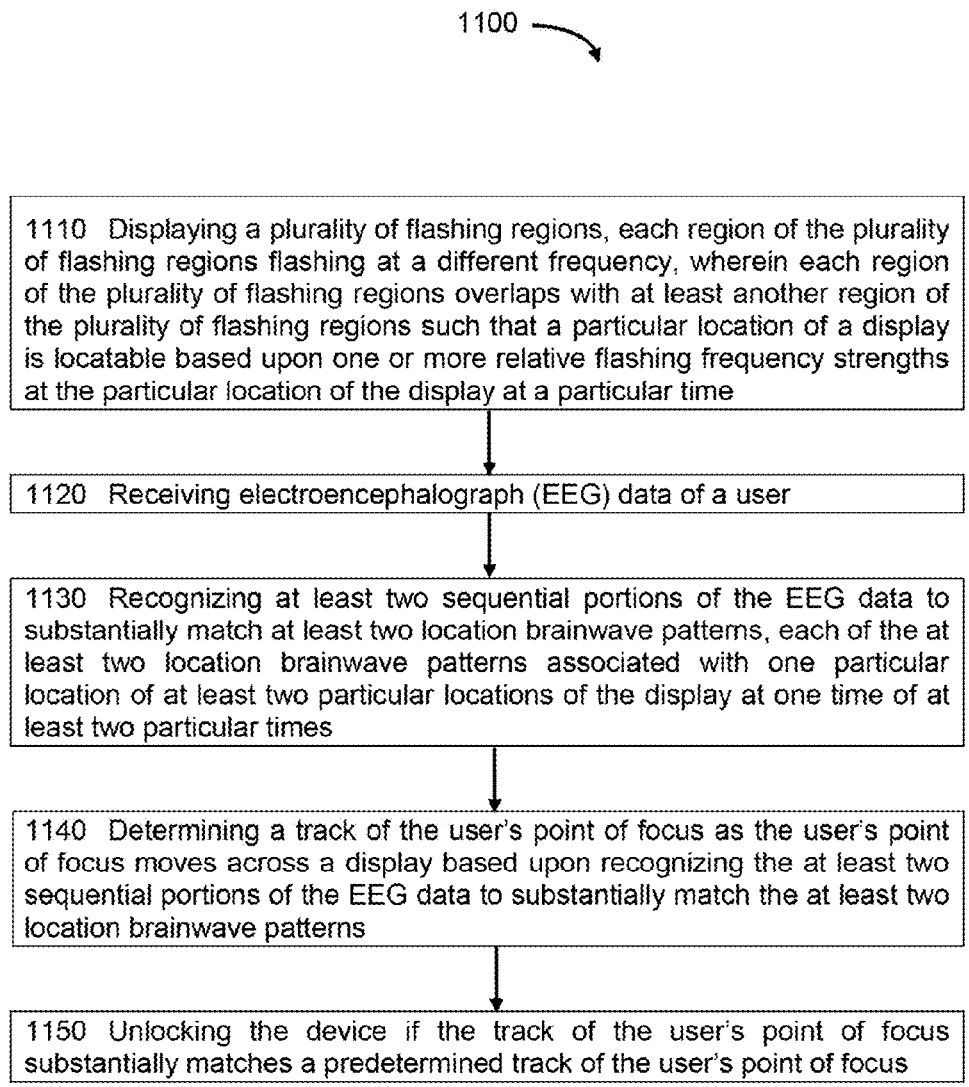
FIG. 11 shows a box diagram associated with a further embodied method for unlocking a device hands-free.

Some embodiments of the method 900 may further include steps from methods as depicted in FIGS. 10 and 11, below.

Referring to FIG. 10, an embodied method 1000 associated with unlocking a device 110, is depicted. It is contemplated that embodiments of the method 1000 may be performed by a processor, software or firmware executed on a computing device, other computing devices, other computer components, or on other hardware, software, firmware, or middleware. The method 1000 may include any or all of steps 1010, 1020, 1030, or 1040, and it is contemplated that the method 1000 may include additional steps as disclosed throughout, but not explicitly set forth in this paragraph. Further, it is fully contemplated that the steps of method 1000 may be performed concurrently or in a non-sequential order.

The method 1000 may include a step 1010, wherein the step 1010 may include displaying a plurality of flashing regions, each of the plurality of flashing regions flashing at a different frequency. The method 1000 may also include a step 1020, wherein the step 1020 may include receiving electroencephalograph (EEG) data of a user. The EEG data may be received from an EEG device 120. The method 1000 may further include a step 1030, wherein the step 1030 may include recognizing at least two sequential portions of the received EEG data to substantially sequentially match at least two region EEG data sets, each of the at least two region EEG data sets corresponding to predicted or recorded EEG data of the user in observance of one of the plurality of flashing regions at a particular frequency. The method 1000 may additionally include a step 1040, wherein the step 1040 may include unlocking the device if the at least two sequential portions of the received EEG data substantially sequentially match the at least two region EEG data sets.

Referring to FIG. 11, a further embodied method 1100 associated with unlocking a device 110, is depicted. It is contemplated that embodiments of the method 1100 may be performed by a processor, software or firmware executed on a computing device, other computing devices, other computer components, or on other hardware, software, firmware, or middleware. The method 1100 may include any or all of steps 1110, 1120, 1130, 1140, or 1150, and it is contemplated that the method 1100 may include additional steps as disclosed throughout, but not explicitly set forth in this paragraph. Further, it is fully contemplated that the steps of method 1100 may be performed concurrently or in a non-sequential order. The method 1100 may include a step 1110, wherein the step 1110 may include displaying a plurality of flashing regions, each region of the plurality of flashing regions flashing at a different frequency, wherein each region of the plurality of flashing regions overlaps with at least another region of the plurality of flashing regions such that a particular location on a display is locatable based upon one or more relative flashing frequencies or intensities at or in proximity to the particular location on the display at a particular time. The method 1100 may also include a step 1120, wherein the step 1120 may include receiving electroencephalograph (EEG) data of a user. The EEG data may be received from an EEG device 120. The method 1100 may further include a step 1130, wherein the step 1130 may include recognizing at least two sequential portions of the received EEG data to substantially match at least two location EEG data sets, each of the at least two location EEG data sets associated with one particular location of at least two particular locations on the display at one time of at least two particular times. The method 1100 may additionally include a step 1140, wherein the step 1140 may include determining a track of the user's point of focus as the user's point of focus moves across the display based upon recognizing the at least two sequential portions of the received EEG data to substantially match the at least two location EEG data sets. The method 1100 may also include a step 1150, wherein the step 1150 may include unlocking the device if the track of the user's point of focus substantially matches a predetermined track of the user's point of focus.

In some embodiments, the method 1100 may further include displaying at least a portion of the track of the user's point of focus on the display upon determining the track of the user's point of focus as the user's point of focus moves across the display.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for activating an operational mode change, comprising:
    flashing one or more of at least one indicator, each of the one or more of the at least one indicator flashing at a particular initial frequency;
    receiving electroencephalograph (EEG) data of a user;
    recognizing a portion of the received EEG data to substantially match activation EEG data, the activation EEG data corresponding to predicted or recorded EEG data of the user in observance of at least one particular indicator of the one or more of the at least one indicator flashing at the particular initial frequency; and
    activating the operational mode change upon recognizing the portion of the received EEG data to substantially match the activation EEG data,
        wherein the particular initial frequency is associated with producing anomalistic resultant EEG data of the user, the anomalistic resultant EEG data at least substantially biometrically unique to the user.

2. The method of claim 1, wherein activating the operational mode change upon recognizing the portion of the received EEG data to substantially match the activation EEG data, further includes:
    activating the operational mode change configured to provide power to a user interface upon recognizing the portion of the received EEG data to substantially match the activation EEG data.

3. The method of claim 2, wherein the user interface comprises a display.

4. The method of claim 3, wherein the display comprises a display selected from the group consisting of an on-device display, a device-coupled display, a touch-screen display, a projection display, a three-dimensional display, a heads up display, a cockpit display, a vehicle display, a dashboard display, a head down display, a retina-projected display, a visor display, or a helmet-mounted display.

5. The method of claim 1, wherein the one or more of the at least one indicator is an off-screen indicator, the off-screen indicator located off of the displayed screen of a display.

6. The method of claim 1, further comprising:
subsequently recognizing a subsequent portion of the received EEG data to substantially match execution EEG data, the execution EEG data corresponding to predicted or recorded EEG data of the user in observance of at least one particular indicator of the one or more of the at least one indicator flashing at the initial frequency or a subsequent frequency; and
executing an action upon subsequently recognizing the subsequent portion of the received EEG data to substantially match the execution EEG data.

7. The method of claim 6, wherein executing an action upon subsequently recognizing a subsequent portion of the received EEG data to substantially match execution EEG data, further includes:
disabling a user interface upon subsequently recognizing a subsequent portion of the received EEG data to substantially match the execution EEG data.

8. The method of claim 6, wherein executing an action upon subsequently recognizing a subsequent portion of the received EEG data to substantially match execution EEG data, further includes:
altering an appearance of a user interface upon subsequently recognizing a subsequent portion of the received EEG data to substantially match execution EEG data.

9. The method of claim 1, further comprising:
changing the particular initial frequency of at least one particular indicator of the one or more of the at least one indicator; and
flashing the at least one particular indicator of the one or more of the at least one indicator at one or more different changed frequencies.

10. The method of claim 1, further comprising:
unlocking the device.

11. The method of claim 1, wherein recognizing a portion of the received EEG data to substantially match activation EEG data, the activation EEG data corresponding to predicted or recorded EEG data of the user in observance of at least one particular indicator of the one or more of the at least one indicator flashing at the particular initial frequency further comprises:
recognizing a portion of the received EEG data to substantially match activation EEG data, the activation EEG data corresponding to predicted or recorded EEG data of the user in observance of at least one particular indicator of the one or more of the at least one indicator flashing at the particular initial frequency, wherein the particular initial frequency is associated with producing archetypal resultant EEG data, the archetypal resultant EEG data at least substantially biometrically typical of all users.

12. The method of claim 1, wherein flashing one or more of the at least one indicator, each of the one or more of the at least one off-screen indicator flashing at a particular initial frequency further comprises:
flashing one or more of the at least one indicator, each of the one or more of the at least one indicator flashing at dynamically changing frequencies over time.

13. The method of claim 12, wherein flashing one or more of the at least one indicator, each of the one or more of the at least one indicator flashing at dynamically changing frequencies over time further comprises:
flashing one or more of the at least one indicator, each of the one or more of the at least one indicator flashing at dynamically changing frequencies over time, the dynamically changing frequencies being cyclically repeated as dynamic frequency cycles such that the user's observance of less than two dynamic frequency cycles is sufficient for recognizing whether received EEG data is a substantial match to predetermined or recorded EEG data.

14. The method of claim 1, further comprising:
displaying a plurality of flashing regions, each of the plurality of flashing regions flashing at a different frequency;
recognizing at least two sequential portions of the received EEG data to substantially sequentially match at least two region EEG data sets, each of the at least two region EEG data sets corresponding to predicted or recorded EEG data of the user in observance of one of the plurality of flashing regions at a particular frequency; and
unlocking the device if the at least two sequential portions of the received EEG data substantially sequentially match the at least two region EEG data sets.

15. The method of claim 1, further comprising:
displaying a plurality of flashing icons, each of the plurality of flashing icons flashing at a different frequency;
recognizing at least two sequential portions of the received EEG data to substantially sequentially match at least two icon EEG data sets, each of the at least two icon EEG data sets corresponding to predicted or recorded EEG data of the user in observance of one of the plurality of flashing icons at a particular frequency; and
unlocking the device if the at least two sequential portions of the received EEG data substantially sequentially match the at least two icon EEG data sets.

16. The method of claim 1, further comprising:
displaying a plurality of flashing regions, each of the plurality of flashing regions flashing at different rolling frequencies;
recognizing at least two sequential portions of the received EEG data to substantially sequentially match at least two region EEG data sets, each of the at least two region EEG data sets corresponding to predicted or recorded EEG data of the user in observance of one of the plurality of flashing regions at particular rolling frequencies; and
unlocking the device if the at least two sequential portions of the received EEG data substantially sequentially match the at least two region EEG data sets.

17. The method of claim 1, further comprising:
displaying a plurality of flashing regions, each region of the plurality of flashing regions flashing at a different frequency, wherein each region of the plurality of flashing regions overlaps with at least another region of the plurality of flashing regions such that a particular location on a display is locatable based upon one or more relative flashing frequency strengths at the particular location on the display at a particular time;
recognizing at least two sequential portions of the received EEG data to substantially match at least two location EEG data sets, each of the at least two location EEG data sets associated with one particular location of at least two particular locations on the display at one time of at least two particular times;

determining a track of the user's point of focus as the user's point of focus moves across the display based upon recognizing the at least two sequential portions of the received EEG data to substantially match the at least two location EEG data sets; and unlocking the device if the track of the user's point of focus substantially matches a predetermined track of the user's point of focus.

18. A method for unlocking a device, comprising:

displaying a plurality of flashing regions, each region of the plurality of flashing regions flashing at a different frequency, wherein each region of the plurality of flashing regions overlaps with at least another region of the plurality of flashing regions such that a particular location on a display is locatable based upon one or more relative flashing frequencies or intensities at or in proximity to the particular location on the display at a particular time;

receiving electroencephalograph (EEG) data of a user;

recognizing at least two sequential portions of the received EEG data to substantially match at least two location EEG data sets, each of the at least two location EEG data sets associated with one particular location of at least two particular locations on the display at one time of at least two particular times;

determining a track of the user's point of focus as the user's point of focus moves across the display based upon recognizing the at least two sequential portions of the received EEG data to substantially match the at least two location EEG data sets; and unlocking the device if the track of the user's point of focus substantially matches a predetermined track of the user's point of focus.

* * * * *